US006602014B2

(12) United States Patent
Lee

(10) Patent No.: US 6,602,014 B2
(45) Date of Patent: Aug. 5, 2003

(54) SHUTTER SYSTEM AND PIVOTING CONNECTORS

(76) Inventor: Han-Sen Lee, 98-1, Show-Tsuo St. Show-Tsuo Village, Fu-Hsing Hsiang, Chang-Hwa Hsien (TW)

( * ) Notice: Subject to any disclaimer, the term of this patent is extended or adjusted under 35 U.S.C. 154(b) by 29 days.

(21) Appl. No.: 09/871,987

(22) Filed: May 31, 2001

(65) Prior Publication Data

US 2002/0026749 A1 Mar. 7, 2002

Related U.S. Application Data

(62) Division of application No. 09/330,884, filed on Jun. 11, 1999, now Pat. No. 6,266,923.

(51) Int. Cl.[7] .................................................. F16C 11/00

(52) U.S. Cl. ........................... 403/68; 403/293; 49/403; 49/74.1

(58) Field of Search .......................... 403/68, 205, 220, 403/292, 293; 49/74.1, 79.1, 92.1, 64, 403

(56) References Cited

U.S. PATENT DOCUMENTS

| | | | | | |
|---|---|---|---|---|---|
| 197,583 | A | | 11/1877 | Allen | |
| 272,914 | A | * | 2/1883 | Soulè | 49/74.1 |
| 633,013 | A | * | 9/1899 | Kooy | 49/74.1 |
| 1,340,252 | A | * | 5/1920 | Rasmussen | 49/74.1 |
| 2,565,979 | A | * | 8/1951 | Michaelsen | 49/74.1 |
| 2,677,157 | A | | 5/1954 | Stefanakis | |
| 3,455,057 | A | | 7/1969 | Baird | |
| 3,487,768 | A | | 1/1970 | Watson | |
| 4,655,003 | A | | 4/1987 | Henley, Sr. | |
| 4,709,506 | A | | 12/1987 | Lukazonas | |
| 5,020,276 | A | | 6/1991 | Zittel | |
| 5,180,250 | A | * | 1/1993 | Ferro | 403/252 |
| 5,187,896 | A | | 2/1993 | Ross | |
| 5,238,042 | A | | 8/1993 | Guerrico-Escheverria | |
| 5,306,210 | A | | 4/1994 | Smit | |
| 5,392,561 | A | | 2/1995 | Henley, Sr. | |
| 5,548,925 | A | | 8/1996 | Marocco | |
| 5,732,507 | A | | 3/1998 | Edwards | |
| 5,775,399 | A | | 7/1998 | Shields, Jr. | |
| 5,778,598 | A | | 7/1998 | Ohanesian | |
| 6,041,547 | A | * | 3/2000 | Marocco | 49/87.1 |

FOREIGN PATENT DOCUMENTS

| | | | | |
|---|---|---|---|---|
| CH | 67203 | * | 1/1914 | 49/74.1 |

* cited by examiner

*Primary Examiner*—Anthony Knight
*Assistant Examiner*—Michael P. Ferguson
(74) *Attorney, Agent, or Firm*—Curtis L. Harrington

(57) ABSTRACT

Several embodiments of the shutters employ a variety of synergistic features which may be used individually or in combination to produce a shutter capable of more completely shutting out light. One aspect is the use of a two-step overlapping end to provide a complementary fit in order to shut out light. Another aspect is the use of an angled engagement pin which engages the louver not at its edge, but into its main expanse and nearer the center of pivot of each louver. Another aspect is the use of an accommodation space to accommodate the "U" shaped attachment member of the simultaneous actuation handle, which accommodation space can vary in size and depth to accommodate structures extending from the simultaneous actuation handle. Regardless of relative size, the louvers, engagement pins, and simultaneous actuation handle can be disciplined to form a neater appearance on the shutter assembly.

10 Claims, 5 Drawing Sheets

SHUTTER SYSTEM AND PIVOTING CONNECTORS

This is a division, of U.S. patent application Ser. No. 09/330,884 filed Jun. 11, 1999 now U.S. Pat. No. 6,266,923.

FIELD OF THE INVENTION

The present invention relates to a louver joinder and actuation system and structures to enable a more complete manipulation and closure to result in a more precise operation and a more complete light blockage in the closed condition.

BACKGROUND OF THE INVENTION

Shutters which fold over window and door openings have been in use for a long time. The louvers of the shutter are either fixed or pivoting. Pivoting louvers are typically hinged at their end points by a pair of projections which mate with a pair of bearing bores. If the cut of the louvers at their ends adjacent the hinged support is closely dimensioned to the typically flat members containing the bearing bore, the light passing through the gap of closed shutters should be sufficiently attenuated.

As the light passes between adjacent pairs of louvers, typically vertically upward or downward of a given louver, this continues to present a problem. Most louvers have main edges along the major part of their length which is rounded. In order for the louvers to act in concert, each louver typically carries a "U" shaped staple attached near the center of its length, and typically on the side with the "fattest" or thickest and most gently curving portion. Put another way, where the louvers are shaped more like an airplane wing, the front edge which is thicker and has a more rounded surface is selected to accept attachment with a staple. Since the thickness of the louvers, even at the thickest edge are still limited, the "U" shaped staples have each leg located longitudinally along the centerline of the thickest edge. A line through the points on the edge of the louver where a staple enters is longitudinal to the louver.

In order for the louvers to act in concert, an simultaneous actuation handle is used having a series of "U" shaped staples which are arranged so that the "U" shaped staples have each leg located longitudinally along the centerline of the simultaneous actuation handle. The curve of each of the "U" shaped staples of the simultaneous actuation handle engage the curve of each of the "U" shaped staples of the louvers. The simultaneous actuation handle may be adjusted to adjust the angles of all of the louvers simultaneously. A groove is typically made into the frame adjacent one of the last louvers of the series in order to accommodate a tip end of the simultaneous actuation handle when the louvers are adjusted to their most closed position, when the simultaneous actuation handle is brought most closely against the louvers and frame.

In this system, there is a significant amount of "play" or looseness between the louvers and the adjustment handle. This looseness can cause some of the louvers not to close in complete concert with the others. Compounding this problem is the position of the louvers at full close. In most louver systems, the full close position is one at which the louvers tangentially overlap each other. The "fat" front of the airfoil louver shape is angled to a position where the rounded front only tangentially contacts the relatively sharper trailing edge of the adjacent louver. Assuming the light leakage at the ends of the louvers abutting contact with the end strips is adequately controlled, the limitation of a tangential contact elsewhere in the louver set represents a huge source of mis-alignment and leaking light. Where the louvers warp, or where either the trailing or leading edge is not cut 100% linearly, or where the pivot bore is ever so slightly misaligned, the louvers will not achieve significant light blockage in the closed position.

In addition to these problems, the problem of connection to the "U" shaped staple to the louvers is one which is not only productive of error in light blockage, it is also ultimately destructive to the louver, especially where the louvers are relatively small and the staples are of significant size. Where the "U" shaped staples enter even the "fat" or leading edge portion of the louver, there may be precious little additional material within the louver to accommodate the lateral forces of the staple. Where the louvers are wood, they will splinter and crack and may chip large amounts of material away. Where this occurs at the last step of manufacture there is a tremendous waste since the remaining parts of the shutter which are in good repair are typically discarded. The use of smaller staples is not always the answer, since in high speed manufacture the staples may bend.

The use of the staples in high speed manufacture also carries the problem of differences in the density of material being used for the shutters. Where wood is used, the staples used for the louvers might be entering a volume of wood which is of significantly higher or lower density than the average. The staple might go in too far to create both an increased splintering problem, as well as an alignment problem with respect to the adjustment handle. For staples in the adjustment handle, this may also be a problem.

The problems enumerated above require a high degree of precise manufacturing, inspection and tollerancing in order to yield a shutter set which can block out the last degree of light. As such, the cost of production rises and high quality high blockage shutters are then placed out of economic reach for ordinary purchasers of such shutters. In addition, where materials change over time, either through moisture exposure, heat cycling and stress, a system which relies upon the integrity of a tangential line between two edges to shut out light the shutters produced will experience a diminution of quality over time.

Another problem relates to the angular pivoting displacement of each louver with respect to the staple in the tangential end of the larger end. In order to try to achieve a nearly 160° rotation of the louvers in order to achieve a range of motion from closed, or as nearly closed as possible, to allowing upwardly directed light, to horizontally directed light, to allowing downwardly directed light, the staples are not in alignment with the mid-plane of the louver. The staples are located to one side of the midplane to insure that in the closed position that the staple is still directed away from the mid-line enough that the simultaneous actuation handle can still function. This off-center mounting which facilitates closure in one direction militates against closure of the louvers in the other direction. Moreover, this mounting insures that the sealing of light between louvers will be along edges which are not the end edges, and edges for which warping of the louvers will admit light.

What is needed is a system which will enable louvers to seal out light by contact on other than their normal tangential contact to one side of the other of the end surfaces. Elimination of the "U" shaped staples inserted directly into the leading edge of the louvers is also needed to reduce scrap and damage, and to eliminate a common failure mode which may be essentially un-repairable in shutters which have been in service for some time.

SUMMARY OF THE INVENTION

The shutters of the invention employ a variety of synergistic features which may be used individually or in combination to produce a superior shutter capable of more completely shutting out light. One aspect is the use of a two-step overlapping end groove to provide a complementary fit in order to shut out light. The overlapping ends of the two end louvers, and their overlap grooves also complement the upper and lower boards of the frame supporting the louver set and are complementary to them. Another aspect of the invention is the use of an angled engagement pin which engages the louver not at its edge, but into its main expanse and nearer the center of pivot of each louver. The main length of the engagement pin enables it to enter the louver at any point significantly away from the edge, all the way to its center. The depth of the engagement pin enables it to be used with louvers of various thicknesses, and the engagement end of the engagement pin can vary in size and shape to either more tightly control the pivot of the louver and its relationship with the simultaneous actuation handle, or to enable loose control and relationship with the simultaneous actuation handle. Another aspect of the invention is the use of an accommodation space to accommodate the "U" shaped attachment member of the simultaneous actuation handle, which accommodation space can vary in size and depth to accommodate structures extending from the simultaneous actuation handle. In some cases where the louvers are thick enough and the simultaneous actuation handle thin enough, a complete accommodation can be had where the simultaneous actuation handle will mount flush into the louvers. Regardless of relative size, the louvers, engagement pins, and simultaneous actuation handle can be disciplined to form a neater appearance on the shutter assembly.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 4:
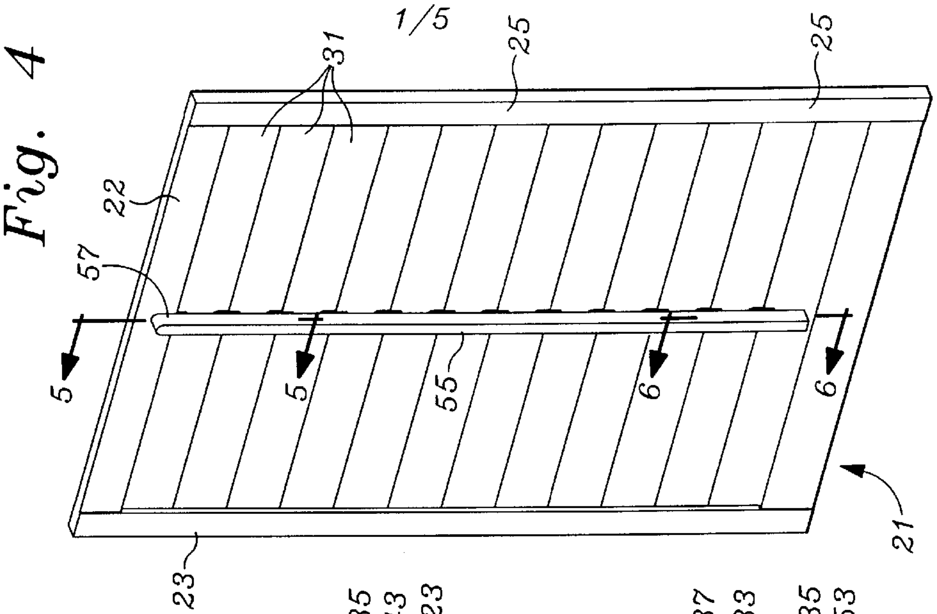
FIG. 4 is a is a rear perspective of the operating side of shutter set and louver assembly of the invention and illustrating the simultaneous actuation handle in position over a set of closed louvers.

The description and operation of the shutter system of the invention will be best described with reference to FIG. 1. A shutter system 21 includes a first side support 23 and a second side support 25. The side supports 23 and 25 are connected at their top ends by a top cross support 27. The side supports 23 and 25 are connected at their bottom ends by a bottom cross support 27. Between the top and bottom cross supports 27 and 29 and pivotally supported by the first and second side supports 23 and 25 is a series of pivotable louvers 31.

Figure 2:
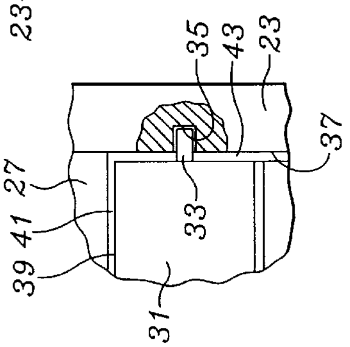
FIG. 2 is a partial sectional view taken along line 2—2 of FIG. 1 and illustrating the pivoting support of one end of an individual louver at an upper end of the shutter.

Referring to FIG. 2, a closeup view of the upper right hand corner of the shutter system 21 illustrates a partial sectional view which exposes a pivot pin 33 which extends into a pivot pin bore 35 within an inside directed surface 37 of the side support 23. At the upper end of the side support 23, an uppermost portion of the louver 31 is seen including an accommodation groove 39 helping to define an upwardly extending overlap groove face 41 which extends behind the lowermost extent of the top cross support 27. The groove 39 and upwardly extending overlap groove face 41 are complementary to the facing structures on the top cross support 27. Between the louver 31 and the side support 23, a gap 43 is minimized, typically by controlling the manufacturing tolerance between the separation of the inside directed surfaces 37 of the side supports 23 and 25, and the length of the louvers 31. The gap 43 in FIG. 2 is exaggerated for illustration purposes, and to show the accommodation groove 39 and upwardly extending overlap groove face 41.

Figure 3:
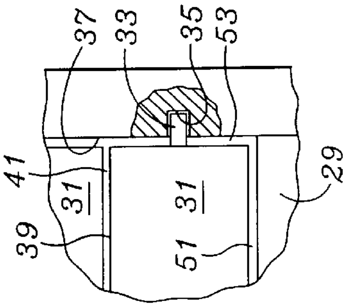
FIG. 3 is a partial sectional view taken along line 3—3 of FIG. 1 and illustrating the pivoting support of one end of an individual louver at a lower end of the shutter.
Figure 1:
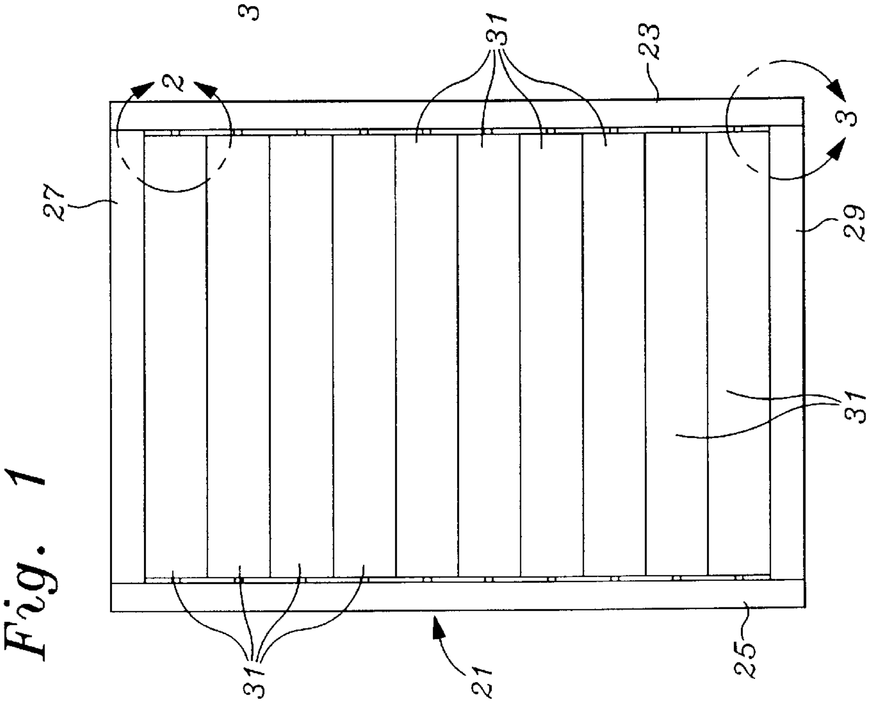
FIG. 1 is a plan view of the shutter system of the present invention in a closed condition and having side pivot supports and top and bottom supports.

Referring to FIG. 3, a view taken along line 3—3 of FIG. 1 illustrates the bottom right side of the shutter system 21, and again we see the accommodation groove 39 and a small bit of the upwardly extending overlap groove face 41 which extends behind the next most upper adjacent louver 31. The bottom of the main louver 31 seen in FIG. 3 is identical to its upper side, but the accommodation groove 39 and overlap groove face 41 on its lower edge is best seen from the other side. The bottom cross support is seen as having a groove 51 which defines an upwardly extending overlap groove face 53 which is seen as extending slightly beyond the end of the louver 31 for clarity. Again, close tollerancing of the length of the louver 31 with respect to the inside directed surface 37 will help to essentially eliminate the gap 43.

Referring to FIG. 4, a rear perspective view, the view which would normally present itself to the user in a room where the shutters of the shutter system 21 were closed over a window opening, is shown. An elongate simultaneous actuation handle 55 is seen vertically adjacent the middle of the louvers 31. The simultaneous actuation handle 55 is in its uppermost position and the louvers 31 are in closed position. The top cross support may contain an accommodation space 57, which partially defines an adjacent overlap groove face 58, the accommodation space 57 to accommodate the uppermost end of the simultaneous actuation handle 55 where necessary. However, as will be shown, the attachment members beneath the simultaneous actuation handle 55 can be adjusted so as to minimize the extent beyond the upper portion of the louver 31 which the simultaneous actuation handle 55 need extend. Since the louvers are closed and configured so that the upper edge of each louver 31 will pivot toward the simultaneous actuation handle 55 in order to open the shutters 21, the simultaneous actuation handle 55 is mounted high in the normal closed position.

Figure 5:
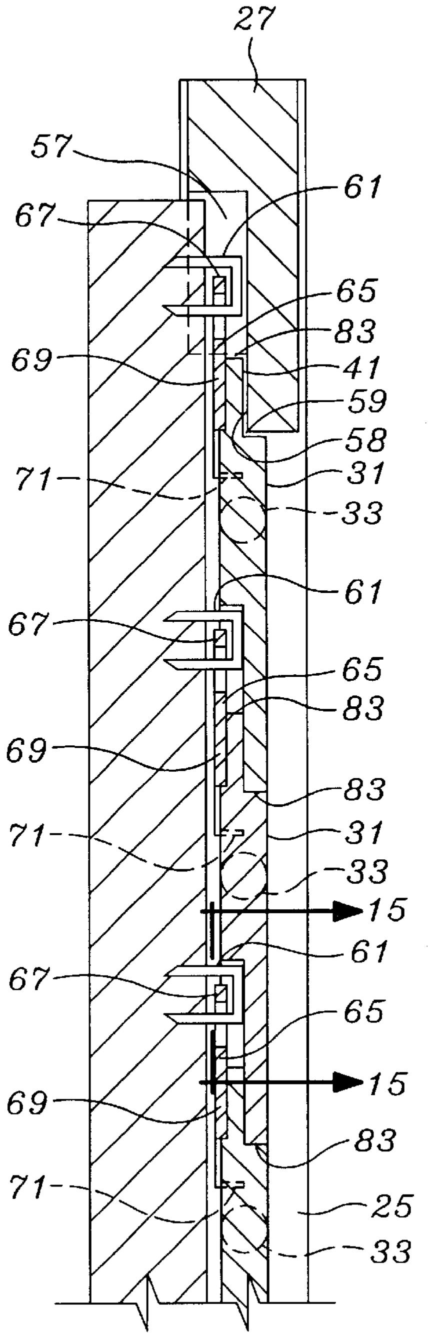
FIG. 5 is a view of the upper portion of the shutter of FIG. 4 at its upper extent along line 5—5 and illustrating an accommodation space made into the upper support, as well as into each louver bottom section, and a first side view of the connector pins of the invention as engaged by the simultaneous actuation handle.

Referring to FIG. 5, a side sectional view of the upper part of the shutter 21 seen in FIGS. 1 and 4 is illustrated in that same closed position. As is seen, the top cross support 27 includes a downwardly projecting member 57 defined somewhat by accommodation space 57. It is behind the downwardly projecting member 58 that the upwardly extending overlap groove face 41 lies opposite and covers. The depths of the accommodation space 57 and projection 59 define the width of the upwardly extending overlap groove face 41 opposing the downwardly projecting member 57. This dimension can change for different shutter systems 21, and may be adjusted to take up the difference in manufacturing tolerance. As will be seen, the tolerances on a shutter system 21 can determine whether reliance on the abutting or interfitting of members will adequately provide light blockage.

Again referring to FIG. 5, the simultaneous actuation handle 55 is seen as having a series of staples 61, each having two beveled shanks, the lines between the beveled points arranged in a common line with the general length of the simultaneous actuation handle 55. Thus the plane of the extent of the staples 61 are parallel to the overall length of the simultaneous actuation handle 55. The staples 61 seen in FIG. 5 are seen as a square “U” shape, but can be of any shape, including rounded, radial, or hemi-octagonal, to name a few. The square “U” shape provides a more disciplined closed orientation for the shutters 31 and simultaneous actuation handle 55.

In each of the staples, the protruding square “U” shape is threaded through the end of a connector pin 65. In the embodiment illustrated, the connector pin 65 is shown in side profile, and has an engagement end 67 which is seen to extend off of the surface of the louvers 31 and provides engagement with the staples 61 slightly away from the louvers 31. In the configuration shown, the location away from the louver 31 of the engagement end 67 is along a line parallel to a plane of a surface of a louver 31, but need not be so. The engagement end 67 of the connector pin 65 can depart from the surface of the louver 31 in any direction sufficient to enable some type of engagement, and not necessarily by the use of staples, by the simultaneous actuation handle 55. Further, and as can be seen in FIG. 5, the connector pin 65 has a main extent 69 lying along a main side plane of the louver and an inserted portion 71 which inserts into the louver 31. Note that the main extent 69 of the connector pin 65 extends far enough along the side of the louver 31 until it overlies the thicker part of the louver 31 before turning in toward the louver 31, penetrating its mass with the inserted portion 71. Further, since the connector pin 65 is relatively flat, it can include multiple segmented insertion portions 71 along its length to further spread and distribute its holding structure.

The pivot pin 33 location is seen in dashed line format on the louver 31 to illustrate that ideally, though not necessarily, the louvers 31 may have symmetry about the pivot pins 33. Offsetting the pivot pins 33 from the center of the louvers 31 would provide mechanical advantage/disadvantage with respect to operation of the simultaneous actuation handle 55, but the shutter 21 would otherwise operate normally.

Since the line 5—5 is taken through the center of the simultaneous actuation handle 55, the accommodation space 57 of the top cross support is seen as being large enough to accommodate not only the upward extent of the staple 61 and engagement end 67 of the connector pin 65, but also the uppermost extent of the simultaneous actuation handle 55. As has been mentioned, a different orientation of the pivot pins 33 would enable a different accommodation orientation, size and shape.

Figure 6:
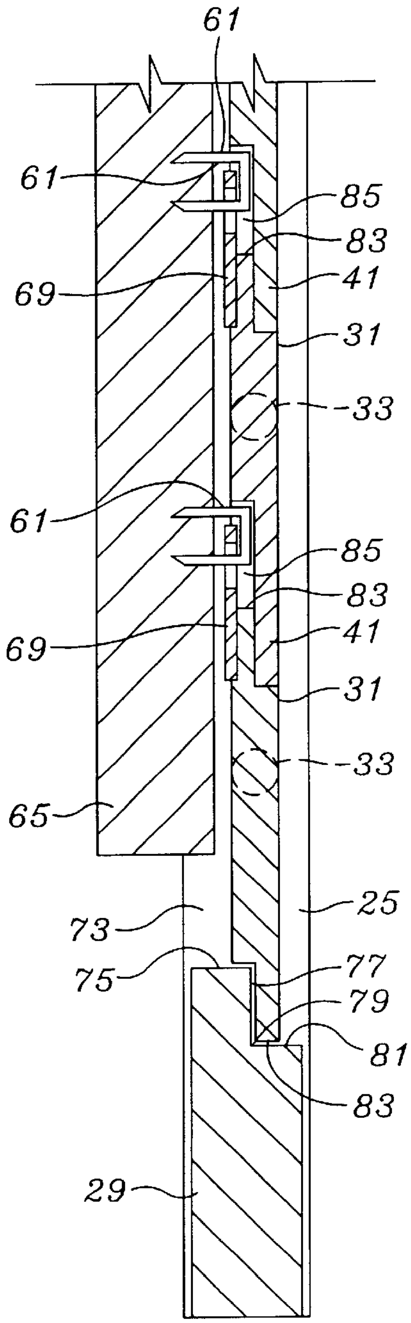
FIG. 6 is a view of the lower portion of the shutter of FIG. 4 along line 6—6, and similar to that seen in FIG. 5, but at the lower end of the shutter of FIG. 4 and illustrating a complementary relationship of the bottom most louver to the bottom connector of the shutter.

Referring to FIG. 6, the lower part of the shutter 21, seen from the same sectional perspective as FIG. 5, illustrates the relationship between the lowermost portion of the simultaneous actuation handle 55 and the bottom cross support 29. A clearance gap 73 is provided between the lowermost extent of the simultaneous actuation handle 55 and the upper edge 75 of the bottom cross support 29. The upper edge 75 of the bottom cross support lies adjacent the upwardly extending overlap groove face 77 which lies opposite downwardly extending overlap groove face 41 of the louver 31. The upwardly extending overlap groove face 53 ends at its lower extent at a groove 79. An upper surface of the groove 79 lies opposite an end surface 83 of the louver 31. The structures 75, 53, and 81 take the place of what would otherwise be an adjacent louver 31 which is not present due to the termination of the downward periodically occurring extent of the louvers 31. In the embodiment shown, the clearance gap 73 is more than enough clearance to enable the simultaneous actuation handle 55 to move out and down in an arcing motion to clear any possibility of interference with the upper edge 75 of the bottom cross support 29.

Also seen with respect to FIG. 6 is a louver accommodation space 85 which is a small rounded notch for accommodating the rounded tip of the engagement end 67 of the connector pin 65. Different shapes of the end of connector pin 65 can result in different shaped louver accommodation spaces. Where the connector pin 65 is shaped to extend away from the surface of the louvers 31, the louver accommodation space 85 is not as needed.

Figure 7:
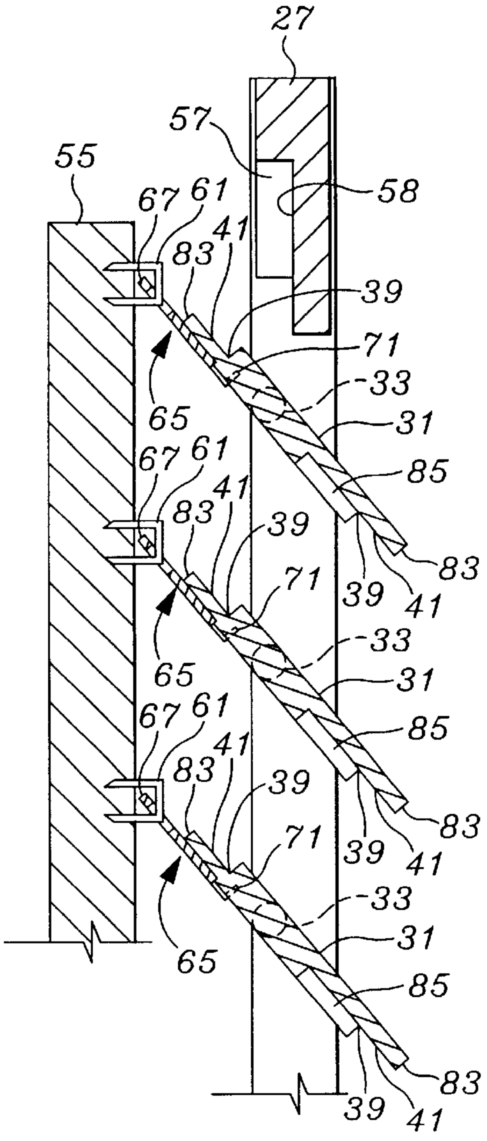
FIG. 7 is a view of the upper portion of the shutter of FIG. 6 at its upper extent and illustrating displacement of the uppermost louver away from the accommodation space made into the upper support, as well as the thin profile of the connector pin.

Referring to FIG. 7, the louvers 31 are all pivotally displaced as the simultaneous actuation handle 55 is moved away from the cross support 27. In the angularly displaced position, the structures on the louvers 31 are more readily seen. The engagement end 67 of the connector pin 65 is seen moving within the square confines of the staple 61. Since the simultaneous actuation handle 55 has many staples 61, each engaging an end of its associated connector pin 65, the simultaneous actuation handle 55 is supported in a stable orientation. In other words, the tact that the staple 61 extends through a relatively larger aperture (as will be seen) in the connector pin 65 correlates to the simultaneous actuation handle 55 being held in a stable position.

More clearly seen in FIG. 7 is the accommodation space 57 in the top cross support 27. As can also be seen, the louvers 31 can pivot about pivot pins 33 at the center of each of the louvers 31. Also, the louver accommodation space 85 is more clearly seen and half of the inside surface of the louver accommodation space 85 is seen as a smooth continuous space extending downwardly to the accommodation groove 39. Note that in FIG. 7, the opposing extending overlap groove faces 41 insure that light is blocked out when the louvers are in the position shown in FIGS. 1–6.

Figure 8:
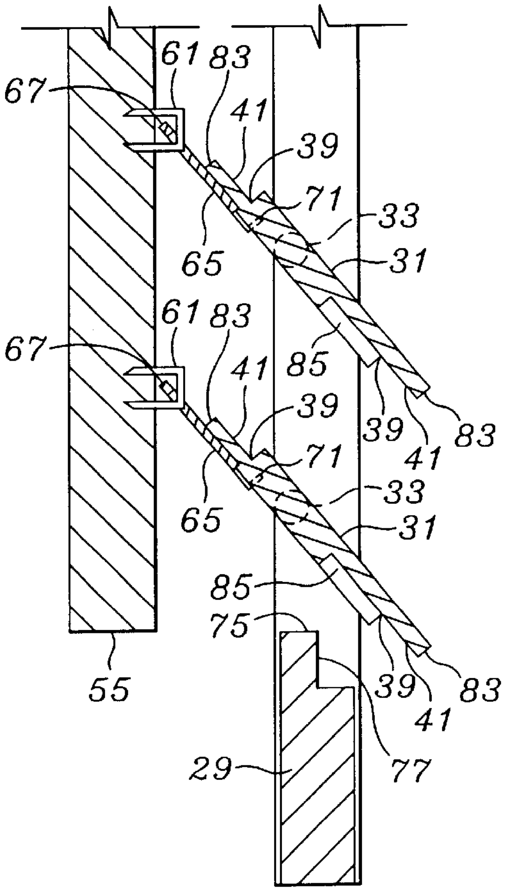
FIG. 8 is a view of the lower portion of the shutter of FIG. 6, similar to that seen in FIG. 7, but at the lower end of the shutter of FIG. 6 and illustrating a complementary relationship of the bottom most louver to the bottom connector of the shutter in a partially open position.

In FIG. 8, the lower portion of the shutters 21 corresponding to the view of FIG. 6 is seen. Upwardly extending overlap groove face 53 of the bottom cross support 29 and the upper edge 75 of the bottom cross support 29 is seen. Note that the inserted portion 71 of the connector pin 65 is seen entering the louver 31 at its thicker portion, further toward the louver 31 pivot pins 33 than the accommodation groove 39. This insures that a more substantial part of the louver 31 is engaged and that the inserted portion 71 can be longer without extending through the overlap groove face 41.

FIGS. 5—8 collectively illustrate the variation which can be achieved in the design. The overlap groove face 41 can be decreased until it is barely above the accommodation groove 39. For loose tolerances, as the overlap groove face 41 becomes almost imperceptible, and where the louver 31 surfaces are white, some multiple reflective light leakage between adjacent louvers may occur. As a result, it is desirable to tighten tolerances as the overlap groove face 41 is reduced, as the upper edge 75 of the bottom cross support 29 moves closer to being flush with the end surface 83 of the louver 31.

Figure 9:
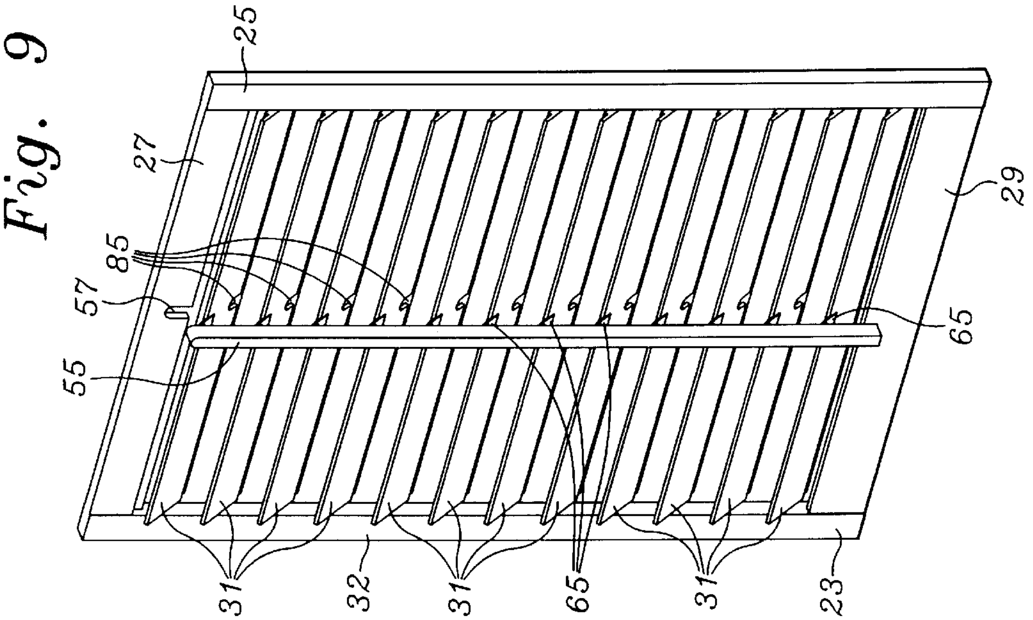
FIG. 9 is a frontal view of an adjacent pair of louvers and illustrating the accommodation space in an upper louver to accommodate the connector pin of the louver shown below it.

Referring to FIG. 9, a perspective view of the shutter 21 from a position similar to that seen in FIG. 4 illustrates the shutter 21 in a position corresponding to the partially open position seen in the views of FIGS. 7 & 8. More clearly seen is the rounded upper accommodation space 57 of the top cross support 27. On each of the louvers 31, except for the bottom most louver 31, is seen a series of rounded accommodation spaces 88 are seen.

Figure 10:
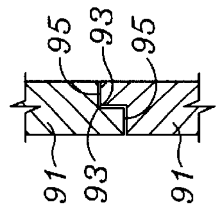
FIG. 10 is a side profile of a pair of adjacent louvers having a shorter overlap groove face.

Referring to FIG. 10, a side profile of a pair of adjacent louvers 91 having a shorter overlap groove face 93 and end illustrates the end surfaces 95. The shorter reflective path for light which might transmit through a space having lesser tolerance is more illustrated in this view. Closer tolerances would enable this embodiment in FIG. 11 to function just as well as the embodiment of FIGS. 1–9. One aspect of the tolerance is the tolerance between the pivot pins 33 and pivot pin bores 35. If this tolerance has the proper amount of over dimension, the louvers 31 could exert a small, finite amount of stacking force on each other. As can be seen in FIGS. 4 and 9, the closing of the shutters 21 typically involves the manual actuation of the simultaneous actuation handle 55. When the louvers 31 are brought to the fully closed position, the simultaneous actuation handle 55 is lifted slightly. Letting go of the simultaneous actuation handle 55 would enable each of the louvers 31 to slightly move downward into a stacking arrangement. Even where the magnitude of the louver 31 overlap groove face 93 virtually disappears, the overlap groove faces 58 at the top cross support 27 and 53 at the bottom cross support 29 can still function to help shut out light between the uppermost louver 31 and the top cross support 27 and the lowermost louver 31 and the bottom cross support 29.

Figure 11:
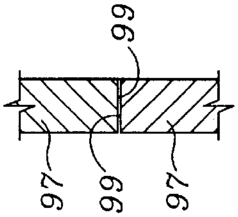
FIG. 11 is a side profile of a pair of adjacent louvers having a rectangular profile.

The employment of such a loosening of the pivot pins 33 with respect to the pivot pin bores 35 will enable an abutting relationship between adjacent louvers 31 which is rectangular. Referring to FIG. 11. Note that where the loosening relationship of the pivot pins 33 with respect to the pivot pin bores 35 is significant enough, the outer edges of an opposing pair of louvers 97 with flat end edges 99 do not have to be radiused to account for the pivoting movement of the louvers. The closing action of the simultaneous actuation handle 55 will be smooth up until the outer edges of two adjacent louvers 97 touch. Where the simultaneous actuation handle 55 is lifted slightly to increase the lift of each of the louvers 31, the end edges brush past each other. When the simultaneous actuation handle 55 is released, the louvers 97 then rest atop each other. From the rectangular profile of FIG. 11, the side edges may be slightly rounded.

Figure 13:
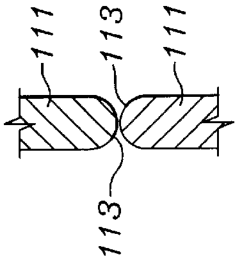
FIG. 13 is a side profile of a pair of adjacent louvers having half circular or hemi-circular, or half cylindrical ends.
Figure 12:
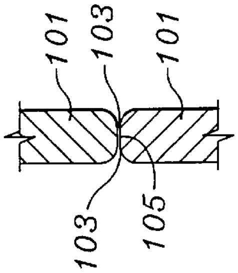
FIG. 12 is a side profile of a pair of adjacent louvers having rounded edges.

In a more extreme case, as is shown in FIG. 12, a pair of adjacent louvers 101 have very rounded edges 103 which transition to flat mid sections 105. The flat mid sections 105 add to stability and increase the length of the narrow space between the louvers 101 and shut out more light. Another embodiment is as shown in FIG. 13 and where a pair of adjacent louvers 111 have half circular or hemi-circular, or half cylindrical ends 113. The ends 113 also assist in enabling the adjacent louvers to fit together, although the interfitting of two cylindrical shapes doesn't supply as much of an elongated path for light to attenuate. The tolerances for the louvers 111 should be close enough that the attenuated path will not cause significant light leakage.

Figure 14:
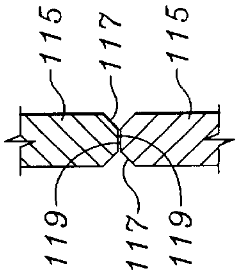
FIG. 14 is a side profile of a pair of adjacent louvers having angled end edges.

Referring to FIG. 14, a pair of adjacent louvers 115 have angled end edges 117 which transition to flat mid sections 119. The flat mid sections 119 add to stability and increase the length of the narrow space between the louvers 115 and shut out more light.

Figure 15:
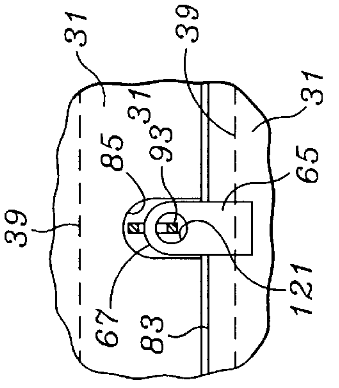
FIG. 15 is a section taken along line 15—15 of FIG. 5.

Next, the wide range of possible geometries of the connector pin 65 will be explored. Referring to FIG. 15, a section taken along line 15—15 of FIG. 5, which cuts through two legs of the staple 61 as it extends from the bottom of the "U" shaped staple, into an aperture 121 of the connector pin 65 located near its engagement end 67, and back over the engagement end 67 and shown terminated in a sectional view. As can be seen, the engagement end 67 is rounded and generally follows the rounded shape of the accommodation space 85 formed in the louver 31 atop the louver 31 into which the illustrated connector pin 65 is inserted. The accommodation space 85 is rounded to match the rounded end of the engagement end 67, and so long as there is an additional clearance for the upper leg of the staple 61 to pass, and enough clearance above the top staple leg, the orientation will work well. Note that where the connector pin 65 turns inward to go into the louver 31, that it is below the accommodation groove 39 so that the inserted portion 71 will extend through the louver 31 at its relatively thicker portion.

Thus, as the position of the accommodation groove 39 rises to create a smaller overlap groove face, the inserted portion of the connector pin 65 can turn towards and into the louver 31 at a point closer to the upper end surface 83 of the louver, and still extend into the thicker portion of the louver 31.

Figure 16:
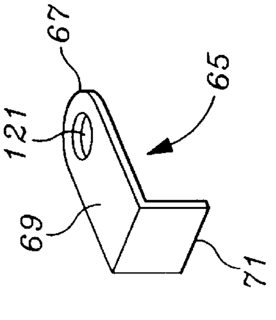
FIG. 16 is a perspective view of the connector pin 65.

Referring to FIG. 16, a perspective view of the connector pin 65 clearly illustrates in mutual context, the engagement end 67, main extent 69, inserted portion 71, and aperture 121. The end of the inserted portion 71 need not have any particular shape, but can have a pointed shape or a slanted shape to assist in its insertion into the louver 31 particularly where the insertion device is not as powerful as would be expected or where the material is difficult to penetrate. It is anticipated that the material from which the louvers 31 are constructed will be wood or plastic, and due consideration to the width of the insertion portion and its affect on the material of the louver to which it is inserted should be given. Note that the connector pin 65 is wide enough that sufficient resistance would be given to movement of the engagement end 67 to either side to side or a bending away from the louver 31.

Connector pin 65 is of such geometry and placement that several improved aspects are had. First, the connection to the louver is not required to be at its end surface 83, which typically has little material available, or is made so overly thick as to interfere with its full range of pivoting. Second, it enables an overlap groove face 41 to be made into the ends of the louvers 31, to reduce their end surfaces 83 since the ends of the louver and new reduced thickness end surfaces 83 do not have to be relied upon for actuation connection to the simultaneous actuation handle 55. Third, although the connector pin 65 thus shown has a main extent 69 which lies closely along the main planar extent of the louver 31 and extends linearly off of the louver 31 and where the adjacent louver contains an accommodation space 85, these need not be in this configuration. Where the connector pin extends away from the surface of the louver 31, either before or after extending beyond the 83 passing the the extent of the end surfaces 83, then the necessity for the accommodation space 85 can be either partially to totally eliminated. Fourthly, the shape of the aperture 121 and the shape of the engagement end 67 of the connector pin 65 can be widely varied. With this variance will come variations in the size and shape and existence of the accommodation space 85, as well as the performance of the interaction of the louvers 31 with the simultaneous actuation handle 55. Even the staples 61 can be varied in size, number and shape to interact with the variations in the shape of the aperture 121 and the shape of the engagement end 67 of the connector pin 65.

Figure 17:
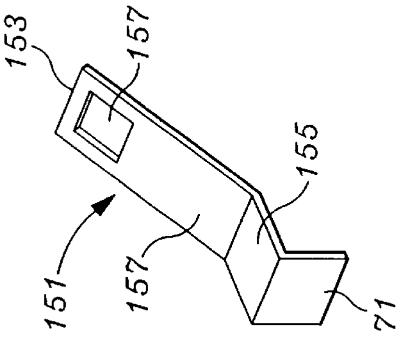
FIG. 17 a connector pin is seen as having an engagement end, an inserted portion, but having a main extent which is divided into a first portion which is adjacent the right angle turn of the inserted portion, a second portion, and a third portion which is adjacent the right angle turn of the second portion.

Referring to FIG. 17, a connector pin 131 is seen as having an engagement end 133, an inserted portion 71, but having a main extent 135 which is divided into a first portion 137 which is adjacent the right angle turn of the inserted portion 71 a second portion 139, and a third portion 141 which is adjacent the right angle turn of the second portion 139. As is seen, the third portion 141 and the first portion 137 are generally parallel, and the second portion 139 is generally perpendicular to both the first and third portions 137 and 141. The length of the second portion 139 between the first and third portions 137 and 141 determine the degree to which the third portion 141 will be offset from the surface of the louver 31. The degree to which the aperture 121 and engagement end 133 are offset from the surface of the louver 31 can be determined both by offset and angularity, and the portions 141 and 137 need not be parallel. If the degree to which the aperture 121 and engagement end 133 are offset from the surface of the louver 31 is great enough, the necessity for the accommodation space 85 can be eliminated. This configuration will result in a resting position for the simultaneous actuation handle 55 which will not be as closely flush to the closed stack of louvers seen in FIG. 4. In addition, where the simultaneous actuation handle 55 rests offset from the stack of closed louvers, the accommodation space 57 for the top cross support 27 is not necessary and can be eliminated. Thus variations on the connector pin 65 can be used to reduce or eliminate the additional manufacturing steps necessary to form the accommodation spaces 57 and 85.

Figure 18:
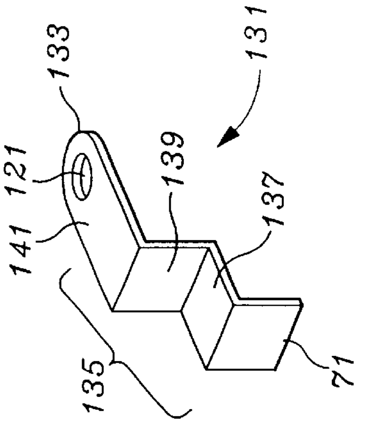
FIG. 18 illustrates a connector pin having an engagement end which is rectangular, and an inserted portion, but having a first portion of a main extent extending at a right angle from the inserted portion in order to extend somewhat parallel with the surface of the louver.

Referring to FIG. 18, a connector pin 151 is seen as having an engagement end 153 which is rectangular, an inserted portion 71, but having a first portion of a main extent 155 extends at a right angle from the inserted portion 71 in order to extend somewhat parallel with the surface of the louver 31, and then angled with respect to a second portion 157 which includes both the rectangular engagement end 153, as well as a rectangular aperture 157. Since the upper side of the rectangular aperture 157 is parallel to the engagement end 153, the engagement of the upper structure can be had not only by a single staple 61, but by a pair of spaced apart staples 61, or by a wide flat staple (not shown) which would squarely occupy and fit just within the width of the rectangular aperture 157. The rectangularity helps prevent side to side pivoting of the simultaneous actuation handle 55, and adds discipline to an arrangement where the simultaneous actuation handle 55 rests offset from the stack of closed louvers.

Figure 19:
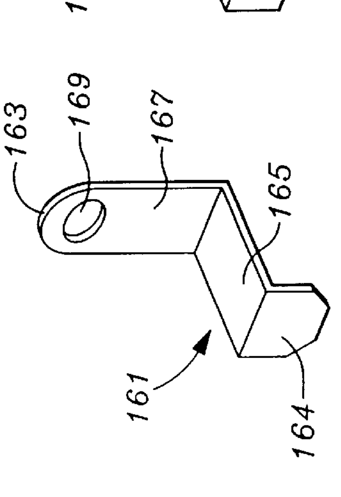
FIG. 19 illustrates a connector pin having an engagement end which is semi octagonal and an inserted portion having a central blunt tip.

Referring to FIG. 19, a connector pin 161 is seen as having an engagement end 163 which is semi octagonal, an inserted portion 164 having a central blunt tip, and a main extent having a first portion 165 of which is at a sharp angle with respect to a second portion 167. An oval aperture 169 may be provided in order to engage one or more staples 61.

Figure 20:
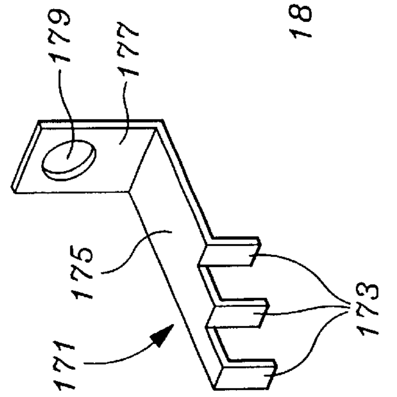
FIG. 20 illustrates a connector pin in which an inserted portion is subdivided into a series of smaller insertion units.

Referring to FIG. 20, a connector pin 171 is shown in which an inserted portion 71 of the previous Figures is subdivided into a series of smaller insertion units 173 which are generally parallel to each other and spaced along different lengths of a main extent first portion 175. The smaller insertion units 173 are formed by forming bends at various places along the main extent first portion 175 and trimming the excess downwardly extending material to leave smaller insertion units 173 located at different lengths along the main extent first portion 175. This turns a single wide cutting nail-like structure into a series of narrower nail like structures and spreads them along the width of the louver 31. The smaller insertion units 175 can be of different length to enable more penetration at points on the louver 31 farthest from the end surface 83 of the louver, and less penetration at points on the louver 31 closest to the end surface 83 of the louver. Also seen in FIG. 20 is a main extent second portion 177 having a rounded aperture 179.

Figure 21:
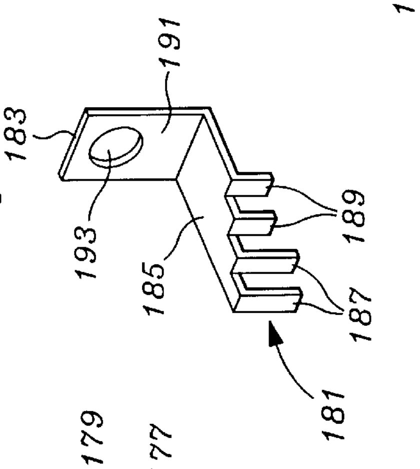
FIG. 21 illustrates a connector pin having a main extent first portion in which a series of two relatively longer spaced apart insertion portions are formed followed by a series of two relatively shorter spaced apart insertion portions.

Referring to FIG. 21, a slightly different version of the connector pin 171 of FIG. 19 is seen as a connector pin 181 and seen as having an engagement end 183, and a main extent first portion 185 in which a series of two relatively longer spaced apart insertion portions 187 are formed, followed by a series of two relatively shorter spaced apart insertion portions 189 are formed. A main extent second portion 191 includes an aperture 193.

Figure 22:
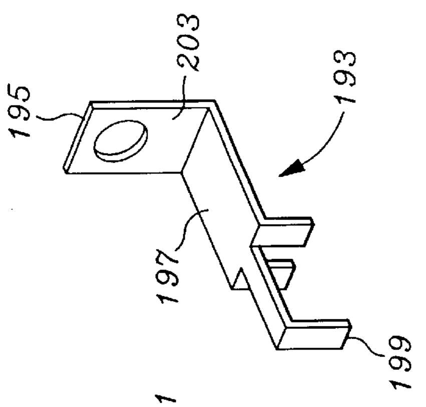
FIG. 22 has an engagement end and a main extent first portion in which a longer middle insertion portion is formed, followed by a series of two relatively shorter spaced apart insertion portions.

Referring to FIG. 22, a slightly different version of the connector pin 181 of FIG. 20 is seen as a connector pin 193 and seen as having an engagement end 195, and a main extent first portion 197 in which a longer middle insertion portion 199 is formed, followed by a series of two relatively shorter spaced apart insertion portions 201, each formed on either side of the longer middle insertion portion 199. A main extent second portion 203 includes an aperture 193.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A connector pin for a shutter system comprising a main extent for mounting closely adjacent a surface of a louver along its length and having a first engagement end portion and a second inserted end portion, opposite said first engagement end portion, and angled with respect to said main extent, for driven insertion into a material of construction of said louver and wherein said main extent includes a first portion for mounting closely adjacent said surface of a louver and a second portion angled away from said surface of said louver to displace said first engagement end portion away from said surface of said louver.

2. A connector pin for a shutter system as recited in claim 1, and wherein said engagement end portion includes an aperture for facilitating connection to an actuation structure.

3. A connector pin for a shutter system as recited in claim 2 and wherein said aperture is round to enable side to side pivoting of said actuation structure.

4. A connector pin for a shutter system as recited in claim 2 and wherein said aperture is rectangularly shaped to partially restrict side to side pivoting of said actuation structure.

5. A connector pin for a shutter system as recited in claim 1 and wherein said first engagement end portion has a rounded tip end.

6. A connector pin for a shutter system as recited in claim 4 and wherein said first engagement end portion has an angled curvature tip end.

7. A connector pin for a shutter system as recited in claim 1 and wherein said second inserted end portion extends at a right angle with respect to said main extent.

8. A connector pin for a shutter system as recited in claim 1 and wherein said second inserted end portion has an angled tip edge to facilitate said insertion into a louver main extent.

9. A connector pin for a shutter system as recited in claim 1 and wherein said second inserted end portion includes a plurality of spaced apart insertion portions to distribute a holding force over a corresponding plurality of insertion entries into said louver.

10. A connector pin for a shutter system as recited in claim 9 wherein at least two of said second inserted end portions are of different length.

* * * * *